(12) United States Patent
Sagata

(10) Patent No.: US 10,798,550 B2
(45) Date of Patent: Oct. 6, 2020

(54) TERMINAL DEVICE, METHOD OF CONTROLLING TERMINAL DEVICE, AND PROGRAM

(71) Applicant: TOYOTA JIDOSHA KABUSHIKI KAISHA, Toyota-shi, Aichi-ken (JP)

(72) Inventor: Koji Sagata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/566,980

(22) Filed: Sep. 11, 2019

(65) Prior Publication Data

US 2020/0162872 A1    May 21, 2020

(30) Foreign Application Priority Data

Nov. 19, 2018  (JP) .................. 2018-216669

(51) Int. Cl.
*H04W 4/80*    (2018.01)
*H04L 29/08*   (2006.01)

(52) U.S. Cl.
CPC ............. *H04W 4/80* (2018.02); *H04L 67/125* (2013.01)

(58) Field of Classification Search
CPC ........ H04W 4/80; H04W 4/02; H04L 67/125; H04L 67/18; H04L 67/24; H04L 67/2838
USPC .............................................. 455/41.1–41.3
See application file for complete search history.

(56) References Cited

U.S. PATENT DOCUMENTS

| | | | | |
|---|---|---|---|---|
| 2012/0295541 A1* | 11/2012 | Kwon | ................... | H04W 76/14 455/41.1 |
| 2013/0005258 A1* | 1/2013 | Uefuji | ............... | H04M 1/72527 455/41.2 |
| 2014/0073254 A1* | 3/2014 | Ichihara | ................. | G07C 5/008 455/41.2 |
| 2015/0194124 A1* | 7/2015 | Yamauchi | ........... | H04M 1/6083 345/211 |
| 2015/0208194 A1 | 7/2015 | Ito et al. | | |
| 2015/0256663 A1* | 9/2015 | Takikawa | ............ | H04M 1/7253 455/418 |
| 2017/0026776 A1* | 1/2017 | Mohdi | .................. | H04W 76/14 |

FOREIGN PATENT DOCUMENTS

JP         2014-021903 A      2/2014

* cited by examiner

*Primary Examiner* — Yuwen Pan
*Assistant Examiner* — Angelica M Perez
(74) *Attorney, Agent, or Firm* — Oliff PLC

(57) ABSTRACT

A controller of a terminal device controls the terminal device in a second control mode in which the terminal device operates in cooperation with the vehicle when the controller determines that the vehicle-mounted device is in the range of the distance in which the short-range wireless communication with the terminal device is possible in a case in which the controller is controlling the terminal device in the first control mode. The controller controls the terminal device in the first control mode when the controller determines that the vehicle-mounted device is not in the range of the distance in which the short-range wireless communication with the terminal device is possible in a case in which the controller is controlling the terminal device in the second control mode.

11 Claims, 4 Drawing Sheets

TERMINAL DEVICE, METHOD OF CONTROLLING TERMINAL DEVICE, AND PROGRAM

INCORPORATION BY REFERENCE

The disclosure of Japanese Patent Application No. 2018-216669 filed on Nov. 19, 2018 including the specification, drawings and abstract is incorporated herein by reference in its entirety.

BACKGROUND

1. Technical Field

The present disclosure relates to a terminal device, a method of controlling the terminal device, and a program.

2. Description of Related Art

In related art, there is known a technology in which a vehicle including a vehicle-mounted device and a terminal device provide a service in cooperation by communicating with each other. For example, Japanese Unexamined Patent Application Publication No. 2014-021903 (JP 2014-021903 A) discloses a technology in which in a terminal device and a vehicle-mounted device mounted in a vehicle, authentication of the terminal device with respect to an application of the vehicle-mounted device is performed through short-range wireless communication in advance, and then, when the application communicates with the terminal device, authentication is omitted and service is rapidly provided.

SUMMARY

In the related art, for example, when a user causes a terminal device such as a mobile phone to cooperate with a vehicle by communicating with the vehicle, the user may be needed to, for example, change a setting of the terminal device and activate an application in order to enable the terminal device to cooperate with the vehicle. Further, the user may be needed to, for example, change the setting of the terminal device and end the application, thereby causing the setting of the terminal device to return to an original setting, even after the cooperation between the terminal device and the vehicle ends. As in this example, in the service that the vehicle including the vehicle-mounted device and the terminal device provide in cooperation by communicating with each other, convenience of the related art is not necessarily high.

An object of the present disclosure made in view of such circumstances is to improve convenience of communication with a vehicle including a vehicle-mounted device, which is performed using a terminal device.

A first aspect of the present disclosure relates to a terminal device including a communication unit configured to perform short-range wireless communication with a vehicle-mounted device included in a vehicle, and a controller configured to control the terminal device in any one of a plurality of control modes. The controller determines whether or not the vehicle-mounted device is in a range of a distance in which the short-range wireless communication with the terminal device is possible, controls the terminal device in a second control mode in which the terminal device operates in cooperation with the vehicle when the controller determines that the vehicle-mounted device is in the range of the distance in which the short-range wireless communication with the terminal device is possible in a case in which the controller is controlling the terminal device in a first control mode, and controls the terminal device in the first control mode when the controller determines that the vehicle-mounted device is not in the range of the distance in which the short-range wireless communication with the terminal device is possible in a case in which the controller is controlling the terminal device in the second control mode.

A second aspect of the present disclosure relates to a method of controlling a terminal device. The method includes a step of performing short-range wireless communication with a vehicle-mounted device included in a vehicle; a step of controlling the terminal device in any one of a plurality of control modes; a step of determining whether or not the vehicle-mounted device is in a range of a distance in which the short-range wireless communication with the terminal device is possible; a step of controlling the terminal device in a second control mode in which the terminal device operates in cooperation with the vehicle when a determination is made that the vehicle-mounted device is in the range of the distance in which the short-range wireless communication with the terminal device is possible in a case in which the terminal device is being controlled in a first control mode; and a step of controlling the terminal device in the first control mode when a determination is made that the vehicle-mounted device is not in the range of the distance in which the short-range wireless communication with the terminal device is possible in a case in which the terminal device is being controlled in the second control mode.

A third aspect of the present disclosure relates to a program. The program causes a terminal device to execute: a step of performing short-range wireless communication with a vehicle-mounted device included in a vehicle; a step of controlling the terminal device in any one of a plurality of control modes; a step of determining whether or not the vehicle-mounted device is in a range of a distance in which the short-range wireless communication with the terminal device is possible; a step of controlling the terminal device in a second control mode in which the terminal device operates in cooperation with the vehicle when a determination is made that the vehicle-mounted device is in the range of the distance in which the short-range wireless communication with the terminal device is possible in a case in which the terminal device is being controlled in a first control mode; and a step of controlling the terminal device in the first control mode when a determination is made that the vehicle-mounted device is not in the range of the distance in which the short-range wireless communication with the terminal device is possible in a case in which the terminal device is being controlled in the second control mode.

With the terminal device, the method of controlling the terminal device, and the program according to the embodiment of the present disclosure, convenience of the communication with the vehicle including the vehicle-mounted device, which is performed using the terminal device, is improved.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described with reference to the drawings.

Configuration of Information Processing System

Figure 1:
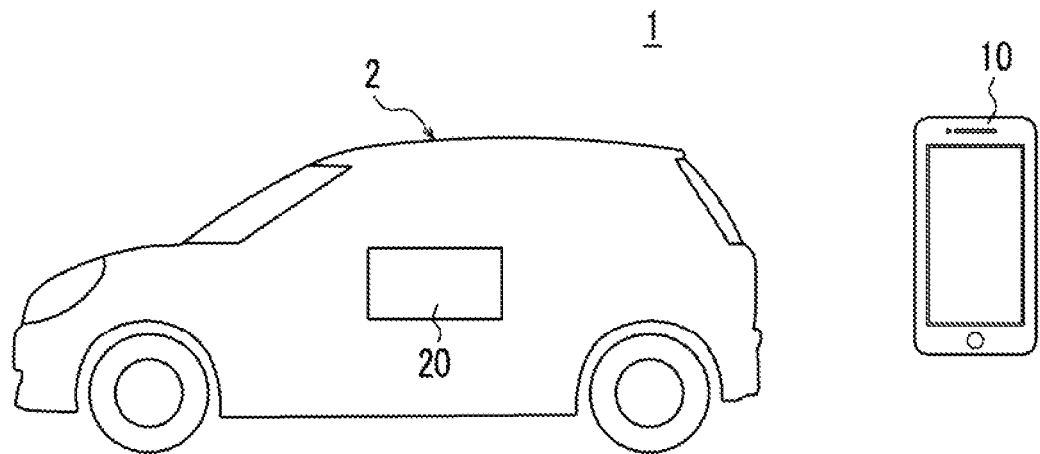
FIG. 1 is a diagram illustrating a schematic configuration of an information processing system according to an embodiment.

An overview of an information processing system 1 according to an embodiment will be described with reference to FIG. 1. The information processing system 1 includes a terminal device 10 and a vehicle 2 including a vehicle-mounted device 20. In FIG. 1, one vehicle 2, one terminal device 10, and one vehicle-mounted device 20 are illustrated for simplicity of description. However, the number of vehicles 2, terminal devices 10, and vehicle-mounted devices 20 included in the information processing system 1 may be determined arbitrarily.

The vehicle 2 is, for example, a car, but is not limited thereto, and may be any vehicle in which a person can get. The terminal device 10 is, for example, a general-purpose mobile terminal such as a smartphone or a tablet terminal, but is not limited thereto. For example, the terminal device 10 may be any mobile terminal such as a device dedicated to the information processing system 1. The terminal device 10 has a short-range wireless communication function using near field communication (NFC), for example. The terminal device 10 can control functions of the terminal device 10 itself in a plurality of control modes. The vehicle-mounted device 20 is a non-contact charger having a short-range wireless communication function using NFC or the like, but is not limited thereto, and may be any electronic device having a short-range wireless communication function. The vehicle-mounted device 20 may be detachably installed in the vehicle 2 or may be installed integrally with the vehicle 2.

Operation Example of Information Processing System

Figure 2:
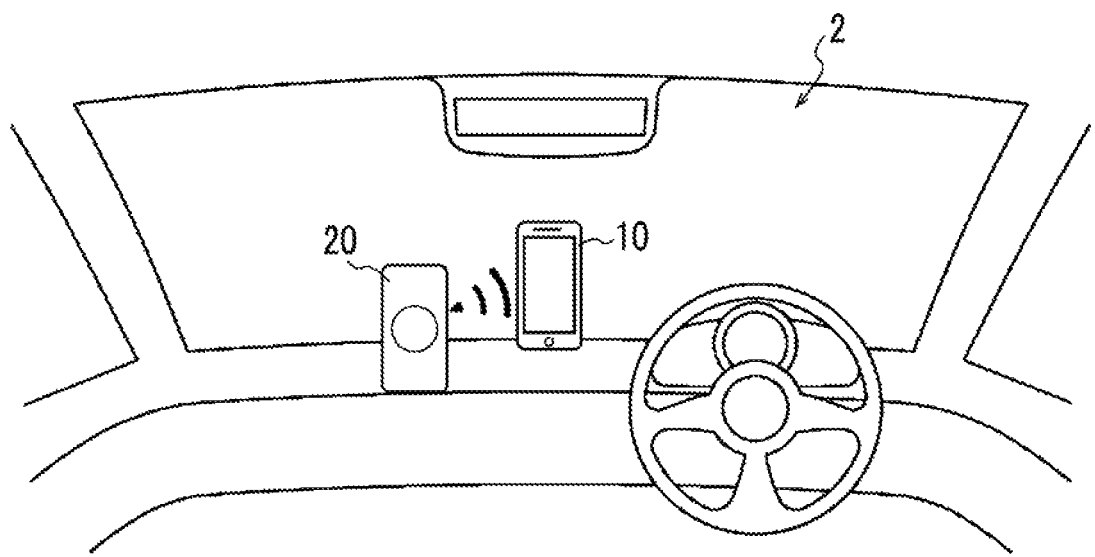
FIG. 2 is a diagram illustrating an overview of an information processing system according to an embodiment.

An operation example of the information processing system 1 according to an embodiment will be described with reference to FIG. 2. FIG. 2 illustrates a vehicle cabin of the vehicle 2 including the vehicle-mounted device 20. When a user of the terminal device 10 gets in the vehicle 2, the user causes the terminal device 10 held by the user to be located in a range of a distance in which short-range wireless communication with the vehicle-mounted device 20 is possible. When the terminal device 10 determines that the terminal device is in the range of the distance in which the short-range wireless communication is possible from the vehicle-mounted device 20 of the vehicle 2 in a case in which the terminal device 10 controls the terminal device in a first control mode, the terminal device 10 starts to control the terminal device in a second control mode in which the terminal device operates in cooperation with the vehicle 2.

In the second control mode, the terminal device 10, for example, turns on a wireless communication function such as Wi-Fi (registered trademark) or Bluetooth (registered trademark) with the vehicle 2 to transmit and receive information to and from the vehicle 2, thereby operating in conjunction with the vehicle 2. The terminal device 10 repeats the determination as to whether or not the vehicle-mounted device 20 is in a range of the distance in which short-range wireless communication with the terminal device is possible in the second control mode.

Then, for example, when the user gets off the vehicle 2, the user takes the terminal device 10 out of the vehicle. When the terminal device 10 determines that the vehicle-mounted device 20 is not in the range of the distance in which the short-range wireless communication with the terminal device is possible, the terminal device 10 starts control of the terminal device in the first control mode.

Thus, according to the information processing system 1, the terminal device 10 switches control from the first control mode to the second control mode when the terminal device 10 enters the range of the distance in which the short-range wireless communication with the vehicle-mounted device 20 is possible. The terminal device 10 causes the control to return to the first control mode again when the terminal device 10 is out of the range of the distance in which the short-range wireless communication with the vehicle-mounted device 20 is possible. Accordingly, when the user gets in or off the vehicle 2, the user may not have to change a setting in order to cause the terminal device 10 to operate in cooperation with the vehicle 2. Therefore, convenience of the communication with the vehicle 2 including the vehicle-mounted device 20, which is performed using the terminal device 10, is improved.

Next, each configuration of the information processing system 1 will be described in detail.

Configuration of Terminal Device

Figure 3:
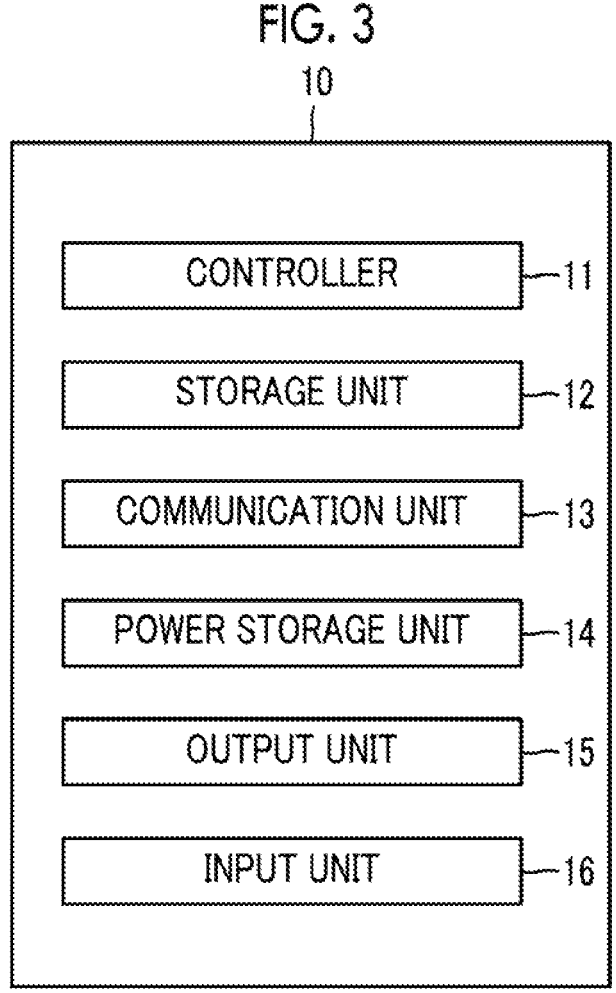
FIG. 3 is a block diagram illustrating a schematic configuration of a terminal device.

As illustrated in FIG. 3, the terminal device 10 includes a controller 11, a storage unit 12, a communication unit 13, a power storage unit 14, an output unit 15, and an input unit 16. The controller 11 is electrically connected to each of the storage unit 12, the communication unit 13, the power storage unit 14, the output unit 15, and the input unit 16.

The controller 11 includes at least one processor to provide control and processing capabilities for performing various functions. The controller 11 may control each of the storage unit 12, the communication unit 13, the power storage unit 14, the output unit 15, and the input unit 16 to realize the functions of these, which will be described below. In the embodiment, the "processor" is a general-purpose processor or a dedicated processor specialized for a specific process, but is not limited thereto. Details of the process of the controller 11 will be described below.

The storage unit 12 stores a process for controlling each function of the terminal device 10, information to be used for the process, a program, and the like. The storage unit 12 may be, for example, a semiconductor memory, a magnetic memory, or an optical memory. The storage unit 12 may function as, for example, a main storage device or an auxiliary storage device. The storage unit 12 may be a cache memory or the like included in the controller 11. The storage unit 12 may be a volatile storage device or a non-volatile storage device. In the embodiment, the storage unit 12 may store, for example, information that is used to control the terminal device 10 in each of the control modes, and information that is used for the vehicle-mounted device 20 to authenticate the terminal device 10, as described below in detail.

The communication unit 13 performs short-range wireless communication with the vehicle-mounted device 20 included in the vehicle 2 based on the control of the controller 11. The communication unit 13 may include, for example, a communication module for short-range wireless communication that corresponds to a communication standard such as NFC in order to perform the short-range wireless communication. The communication unit 13 may further communicate with the vehicle 2 including the vehicle-mounted device 20 and an external device not included in the vehicle 2 using any method. Therefore, the communication unit 13 may include, for example, any wireless communication module such as a wireless LAN communication module corresponding to a communication standard such as Wi-Fi, a Bluetooth communication module, and a mobile communication module corresponding to a mobile communication standard such as 4G (4th Generation) or 5G (5th Generation), in addition to the communication module for short-range wireless communication. Further, the communication unit 13 may include any wired communication module such as a wired LAN communication module.

The power storage unit 14 supplies power that is used for an operation of the terminal device 10. The power storage unit 14 may be, for example, a dry cell, a power storage cell, or the like. Further, the power storage unit 14 may include, for example, an adapter for receiving power supply from an external power supply, and the power may be supplied from the external power supply. Examples of the adapter for receiving power supply from the external power source may include a non-contact charge adapter and an AC power adapter. When the power storage unit 14 includes a non-contact charge adapter, the controller 11 can charge the power storage unit 14 by receiving power feeding radio waves from the non-contact charger using the non-contact charge adapter of the power storage unit 14.

The output unit 15 outputs information as sound, vibration, light, an image, or the like based on the control of the controller 11. The output unit 15 may include, for example, at least one of a speaker, a vibrator, a light, and a display device. The output unit 15 may output information such as a current control mode of the terminal device 10 and whether or not communication with the vehicle-mounted device 20 is possible. For example, when the vehicle-mounted device 20 is detected in the range in which the short-range wireless communication with the terminal device 10 is possible, the output unit 15 may output information to the display device to notify the user of the detection of the vehicle-mounted device 20.

The input unit 16 receives an input manipulation from the user. The input unit 16 may include, for example, at least one of a physical key such as a power button, an input device such as a touch panel, a pointing device such as a mouse, a microphone that receives an audio input, and a camera that receives a gesture input. When the input unit 16 receives an input manipulation of the user, the input unit 16 transmits the input manipulation to the controller 11 as electronic information. The input manipulation of the user may include, for example, a manipulation for adding, changing, and deleting the control information in each of the control modes to be described below.

Hereinafter, control of the terminal device 10 using the controller 11 will be described. The controller 11 controls the terminal device 10 in any one of the control modes. Control information to be used to control the terminal device in the control modes may be associated with each of the control modes and stored. The control information may include, for example, control target information indicating a function (for example, a wireless communication function using Wifi and Bluetooth) and an application (for example, a route guidance application) that are control targets for activation, stop, or standby in each control mode. The control information may also include control content information indicating control content (for example, activation, stop, or standby) of a function and an application that is a control target in each control mode. The controller 11 may switch control mode or add, change, and delete the control information according to a predetermined application.

The control modes include at least a control mode in which the terminal device 10 operates in cooperation with the vehicle 2 including the vehicle-mounted device 20, and other control modes. Hereinafter, for the sake of description, a control mode before the user of the terminal device 10 gets in the vehicle 2 including the vehicle-mounted device 20 is referred to as the first control mode, and a control mode in which the terminal device 10 operates in cooperation with the vehicle 2 including the vehicle-mounted device 20 is referred to as the second control mode. The control modes included in the control modes are not limited to thereto. The number of control modes included in the control modes and control information in each control mode may be arbitrarily determined.

The controller 11 determines whether or not the vehicle-mounted device 20 is in the range of the distance in which the short-range wireless communication with the terminal device is possible.

For example, the controller 11 may determine whether or not the vehicle-mounted device 20 is in a range of a distance in which the short-range wireless communication with the terminal device 10 is possible, based on whether or not the controller 11 has received a predetermined signal from the vehicle-mounted device 20 via the short-distance wireless communication. The predetermined signal may be any signal that is transmitted from the vehicle-mounted device 20 through short-range wireless communication. For example, the predetermined signal may be a signal that is transmitted from the vehicle-mounted device 20 to indicate being in the range in which short-range wireless communication with the vehicle-mounted device 20 is possible. Alternatively, the predetermined signal may be a signal that is transmitted from the vehicle-mounted device 20 as a response to the signal transmitted from the terminal device 10. When the controller 11 receives the predetermined signal transmitted from the vehicle-mounted device 20 through the short-range wireless communication using the communication unit 23, the controller 11 may determine whether or not the vehicle-mounted device 20 is in the range of the distance in which the short-range wireless communication with the terminal device 10 is possible.

Further, for example, the controller 11 may determine whether or not the vehicle-mounted device 20 is in the range of the distance in which the short-range wireless communication with the terminal device 10 is possible, based on whether or not a signal including the result of the vehicle 2 authenticating the terminal device 10 has been received from the vehicle-mounted device 20 through the short-range wireless communication based on the authentication request from the terminal device 10. The terminal device 10 transmits an authentication request including information for uniquely identifying the terminal device 10, such as an identifier (ID; identifier), a serial number, or a model number of the terminal device 10, to the vehicle-mounted device 20 of the vehicle 2 through the short-range wireless communication. As will be described below, the terminal device 10 is authenticated by the vehicle 2 based on the transmitted authentication request. A signal including an authentication result may be transmitted from the vehicle-mounted device 20 of the vehicle 2 to the terminal device 10 through the short-range wireless communication regardless of success or failure of the authentication, or solely when the authentication is successful. The signal including the authentication result may be transmitted to the terminal device 10 through the short-range wireless communication. When the controller 11 receives the signal indicating the success of the authentication from the vehicle-mounted device 20 through the short-range wireless communication, the controller 11 may determine that the vehicle-mounted device 20 is in the range of the distance in which the short-range wireless communication with the terminal device 10 is possible.

Further, for example, the vehicle-mounted device 20 may include a power feeding unit 27 capable of transmitting power feeding radio waves in the vicinity of the communication unit 23, in addition to the communication unit 23 capable of performing short-range wireless communication. Here, "near" means that the communication unit 23 and the power feeding unit 27 are close to the extent that the terminal device 10 can perform the short-range wireless communication with the communication unit 23 when the terminal device 10 is at a position in which the terminal device 10 can receive the power feeding radio waves transmitted from the power feeding unit 27. In such a case, the controller 11 may determine whether or not the vehicle-mounted device 20 is in the range of the distance in which the short-range wireless communication with the terminal device is possible, based on whether or not the terminal device receives the power feeding radio waves transmitted from the power feeding unit 27. Accordingly, the terminal device 10 can determine that the terminal device can perform short-range wireless communication with the vehicle-mounted device 20 in a state in which power is stably supplied. The controller 11 is not limited to these methods, and may determine whether or not the vehicle-mounted device 20 is in the range of the distance in which the short-range wireless communication with the terminal device is possible using any method.

When the controller 11 determines that the vehicle-mounted device 20 is not in the range of the distance in which the short-range wireless communication with the terminal device 10 is possible, the controller 11 continues to control the terminal device in the first control mode, which is a current control mode. On the other hand, when the controller 11 determines that the vehicle-mounted device 20 is in the range of the distance in which the short-range wireless communication with the terminal device is possible in a case in which the controller 11 controls the terminal device in the first control mode, the controller 11 controls the terminal device in the second control mode in which the terminal device operates in cooperation with the vehicle 2.

The controller 11 may perform wireless communication of a scheme different from the short-range wireless communication with the vehicle 2 when the controller 11 controls the terminal device in the second control mode. Here, performing the wireless communication with the vehicle 2 may include performing the wireless communication with the vehicle-mounted equipment 4. As will be described below, the vehicle-mounted equipment 4 may include, for example, any equipment detachably installed in the vehicle 2 or integrally installed in the vehicle 2, such as a control device (ECU; Electronic Control Unit), a communication device (DCM; Data Communication Module), a vehicle-mounted sensor, a non-contact charger, a car navigation system, or a media player. Specifically, in the second control mode, the controller 11 turns on a wireless communication function such as Wi-Fi or Bluetooth and starts wireless communication with the vehicle-mounted equipment 4 of the vehicle 2. The controller 11 can perform a cooperative operation with the vehicle 2 including the vehicle-mounted device 20 by performing the wireless communication.

For example, the controller 11 may acquire information from the vehicle 2 via the wireless communication. The information acquired from the vehicle 2 may include, for example, so-called probe data, such as position information of the vehicle 2, speed information of the vehicle 2, information of a odometer, information of a storage battery such as electric capacity (SoC; State Of Charge) and a degree of deterioration (SoH; States Of Health), and information such as a remaining amount of light oil or gasoline. Further, the controller 11 may transmit at least a part of the information acquired from the vehicle 2 to an external device (for example, a data center) through mobile communication.

Further, for example, the controller 11 may control the operation of the vehicle 2 by transmitting information to the vehicle 2 via the wireless communication. In detail, the controller 11 may control an operation of the vehicle-mounted equipment 4 included in the vehicle 2. For example, the controller 11 causes the vehicle-mounted equipment 4 (for example, a car navigation system) to display, for example, a screen to be displayed on the terminal device 10 or sets a volume of the vehicle-mounted equipment 4 to a predetermined value. The controller 11 operates in cooperation with the vehicle 2 including the vehicle-mounted device 20 by performing the above-described control in the second control mode. The controller 11 may operate in cooperation with the vehicle 2 including the vehicle-mounted device 20 by performing any control without being limited to the above-described control.

When the controller 11 determines that the vehicle-mounted device 20 is not in the range of the distance in which the short-range wireless communication with the terminal device is possible in a case in which the controller 11 controls the terminal device in the second control mode, the controller 11 controls the terminal device in the first control mode. The first control mode may be a control mode before the user of the terminal device 10 gets in the vehicle 2 including the vehicle-mounted device 20 as described above. The controller 11 switches the control of the terminal device from the second control mode to the first control mode to cause a state of the terminal device 10 including the application for setting and activating wireless communication or the like to return to the state before the user gets in the vehicle 2. The controller 11 may end the wireless communication with the vehicle 2 by switching control of the terminal device from the second control mode to the first control mode. The controller 11 may end acquisition of information from the vehicle 2 or transmission of information to the vehicle 2 by switching control of the terminal device from the second control mode to the first control mode. Further, the controller 11 may end the application that is used in the second control mode by switching the control of the terminal device from the second control mode to the first control mode.

The controller 11 may control switching between the control modes using a predetermined application. The controller 11 may switch control of the device from the first control mode to the second control mode and start the control in the second control mode, for example, according to a predetermined application. Further, the controller 11 may switch the terminal device from the second control mode to the first control mode and start the control in the first control mode using a predetermined application.

Even when the controller 11 controls the terminal device in the second control mode, the controller 11 repeatedly determines whether or not the vehicle-mounted device 20 is in the range of the distance in which the short-range wireless communication with the terminal device is possible. The determination may be repeated at predetermined time intervals or each time a predetermined process is executed. When the controller 11 determines that the vehicle-mounted device 20 is in the range of the distance in which the short-range wireless communication with the terminal device is possible during control in the second control mode, the controller 11 may then continue to control the terminal device 10 in the second control mode. When the controller 11 determines that the vehicle-mounted device 20 is not in the range of the distance in which the short-range wireless communication with the terminal device is possible in the second control mode, the controller 11 may end the control in the second control mode and perform be control in the first control mode.

When the terminal device 10 repeats the determination as to whether or not the vehicle-mounted device 20 is in a range of the distance in which short-range wireless communication with the terminal device is possible in the second control mode, the controller 11 may repeat a determination using the same method or may combine and perform determinations using a plurality of methods. When the controller 11 controls the terminal device in the second control mode, the controller 11 may repeat the determination as to whether or not a predetermined signal including a result of the vehicle 2 performing the authentication of the terminal device 10 based on the authentication request from the terminal device 10 has been received through the short-range wireless communication, as described above. Accordingly, the controller 11 can improve the security of information transmitted and received between the terminal device 10 and the vehicle 2 when operating the terminal device in cooperation with the vehicle 2 in the second control mode.

There may be a plurality of second control modes respectively corresponding to a plurality of kinds of vehicles. In such a case, when the controller 11 determines that the vehicle-mounted device 20 is in the range of the distance in which the short-range wireless communication with the terminal device is possible, the controller 11 controls the terminal device 10 in any one of the second control modes. For example, the predetermined signal described above may include information indicating the kind of the vehicle 2. The controller 11 may control the terminal device 10 in the second control mode corresponding to the kind of the vehicle 2 included in the predetermined signal among the second control modes when the predetermined signal is received.

The information indicating the kind of the vehicle 2 may include, for example, the kind of the vehicle or information for specifying the kind of the vehicle 2. Further, the information indicating the kind of the vehicle 2 may include information for specifying the vehicle-mounted device 20 included in the vehicle 2 or information for specifying a communication scheme with the vehicle-mounted equipment 4 included in the vehicle 2. For example, the controller 11 may control the terminal device in different second control modes among the second control modes when the controller 11 determines that the vehicle 2 is an electric vehicle and when the controller 11 determines that the vehicle 2 is an engine vehicle based on the information indicating the kind of the vehicle 2. For example, when the controller 11 determines that the vehicle 2 is an electric vehicle, the controller 11 may control the terminal device in a second control mode in which information of a storage batteries such as SoC and SoH is acquired from the vehicle 2. Further, when the controller 11 determines that the vehicle 2 is an engine vehicle, the controller 11 may control the terminal device in the second control mode in which information such as the remaining amount of light oil or gasoline is acquired from the vehicle 2.

When controller 11 receives an input manipulation to add, change, and delete control information in each of the control modes using the input unit 16, the controller 11 associates the input control information with each control mode and stores the information in the storage unit 22. For example, the user of the terminal device 10 inputs control information such as information such as ON or OFF of a function regarding wireless communication with the vehicle 2 using Wi-Fi or Bluetooth, or information on whether or not transmission of the information acquired from the vehicle 2 to an external device is possible in the second control mode, using the input unit 16. When the controller 11 controls the terminal device in the second control mode, the controller 11 may control the terminal device based on the control information in the second control mode received by the input unit 16.

Configuration of Vehicle Including Vehicle-Mounted Device

Figure 4:
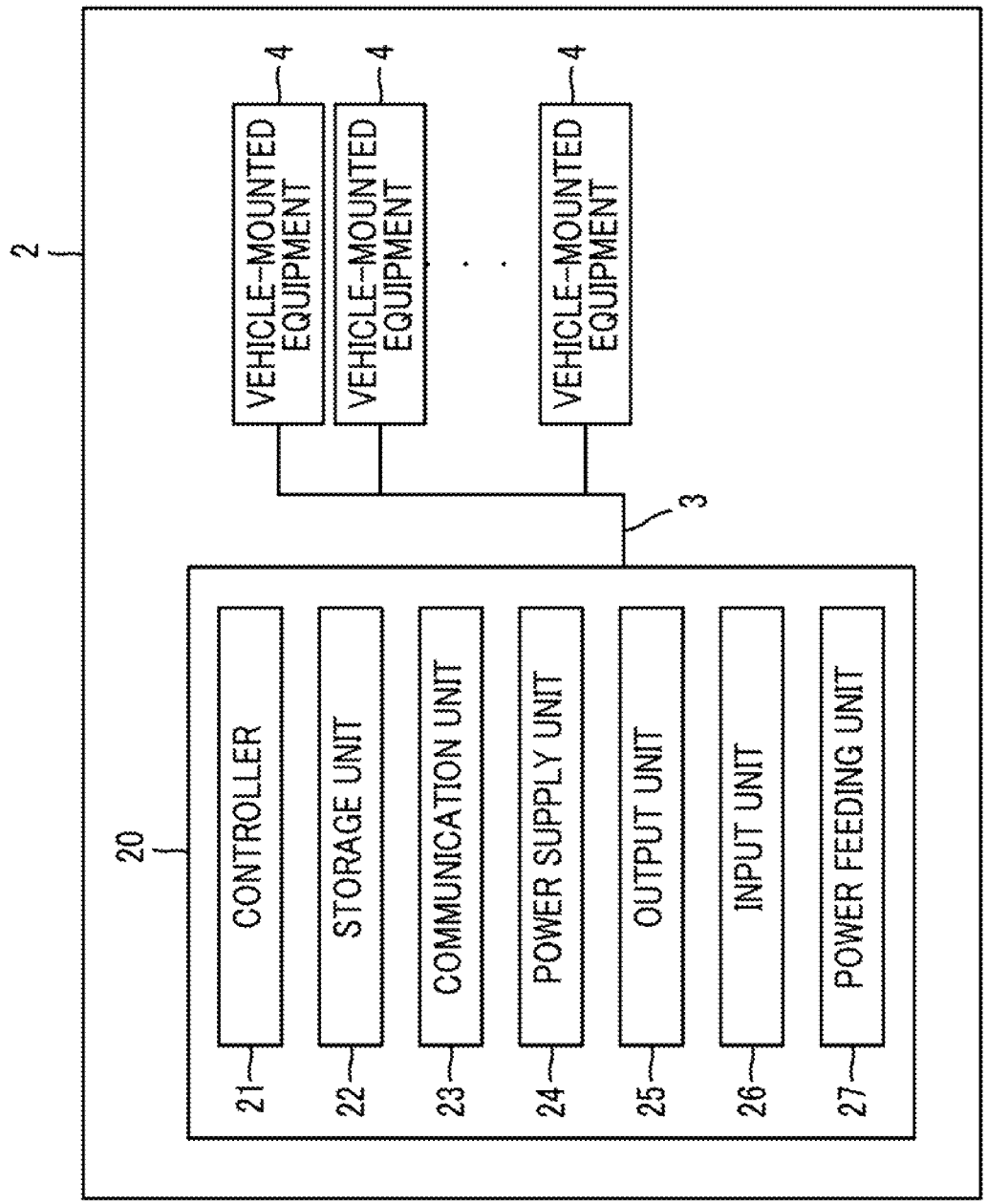
FIG. 4 is a block diagram illustrating a schematic configuration of a vehicle including a vehicle-mounted device.

FIG. 4 is a functional block diagram schematically illustrating a configuration of the vehicle 2 including the vehicle-mounted device 20. The vehicle-mounted device 20 includes a non-contact charger having the short-range wireless communication function as described above, but may be any device having the short-range wireless communication function. The vehicle-mounted device 20 may be installed integrally with the vehicle 2 or may be detachably installed in the vehicle 2. The vehicle 2 may include one or more vehicle-mounted equipment 4, in addition to the vehicle-mounted device 20. Examples of the vehicle-mounted equipment 4 include an ECU, a DCM, a vehicle-mounted sensor, a car navigation system, and a media player, but the present disclosure is not limited thereto and the vehicle-mounted equipment 4 may be any vehicle-mounted device installable in the vehicle 2. The vehicle-mounted device 20 may be communicatively connected to the vehicle 2 and the vehicle-mounted equipment 4 via a vehicle-mounted network 3 such as a controller area network (CAN).

The vehicle-mounted device 20 includes a controller 21, a storage unit 22, a communication unit 23, a power supply unit 24, an output unit 25, an input unit 26, and a power feeding unit 27. The controller 21 is electrically connected to each of the storage unit 22, the communication unit 23, the power supply unit 24, the output unit 25, the input unit 26, and the power feeding unit 27.

The controller 21 includes at least one processor to provide control and processing capabilities for executing various functions. The controller 21 may control each of the storage unit 22, the communication unit 23, the power supply unit 24, the output unit 25, the input unit 26, and the power feeding unit 27, which will be described below. Details of the process of the controller 21 will be described below.

The storage unit 22 stores a process for controlling each function of the vehicle-mounted device 20, information to be used for the process, a program, and the like. The storage unit 22 may be, for example, a semiconductor memory, a magnetic memory, or an optical memory. The storage unit 22 may function as, for example, a main storage device or an auxiliary storage device. The storage unit 22 may be a cache memory or the like included in the controller 21. The storage unit 22 may be a volatile storage device or a non-volatile storage device. In the embodiment, the storage unit 22 may store, for example, information to be used for authentication of the terminal device 10, as will be described in detail below.

The communication unit 23 performs short-range wireless communication with the terminal device 10 based on the control of the controller 21. The communication unit 23 may include, for example, a communication module for short-range wireless communication that corresponds to a communication standard such as NFC in order to perform the short-range wireless communication. The communication unit 23 may further communicate with the terminal device 10, the vehicle-mounted equipment 4 included in the vehicle 2, and an external device not included in the vehicle 2 using an arbitrary method. Therefore, the communication unit 23 may include, for example, any wireless communication module such as a wireless LAN communication module corresponding to a communication standard such as Wi-Fi, a Bluetooth communication module, and a mobile communication module corresponding to a mobile communication standard such as 4G and 5G, in addition to the communication module for short-range wireless communication. The communication unit 23 may also include any wired communication module such as a CAN communication module and a wired LAN communication module.

The power supply unit 24 supplies power to be used for the operation of the vehicle-mounted device 20. The power supply unit 24 may include, for example, a dry battery or a power storage cell. Further, the power supply unit 24 may include, for example, an adapter for receiving power supply from an external power supply such as a battery of the vehicle 2, and power may be supplied from the external power supply.

The output unit 25 outputs information as sound, vibration, light, an image, or the like based on control of the controller 21. The output unit 25 may include, for example, at least one of a speaker, a vibrator, a light, and a display device. The output unit 25 may output an authentication result of the terminal device 10 and information such as whether or not communication with the terminal device 10 is possible. For example, when the terminal device 10 is detected in the range in which the short-range wireless communication with the vehicle-mounted device 20 is possible, the output unit 25 may output information to the display device to notify the user of the detection of the terminal device 10.

The input unit 26 receives an input manipulation from the user. The input unit 26 may include, for example, at least one of a physical key such as a power button, an input device such as a touch panel, a pointing device such as a mouse, a microphone that receives a voice input, and a camera that receives a gesture input. When the input unit 26 receives an input manipulation of the user, the input unit 26 transmits the input manipulation to the controller 21 as electronic information. The input manipulation may include, for example, an instruction to start transmission of a signal through short-range wireless communication.

The power feeding unit 27 transmits power feeding radio waves to another electronic equipment based on the control of the controller 21. The power feeding unit 27 may transmit, for example, power feeding radio waves corresponding to a Qi (registered trademark) standard to perform non-contact charging on the other electronic equipment. The power feeding unit 27 may be disposed near the communication unit 23.

Hereinafter, control of the vehicle-mounted device 20 that is performed by the controller 21 will be described. The controller 21 may transmit a predetermined signal through short-range wireless communication. The predetermined signal may be a signal for indicating being in the range in which short-range wireless communication with the vehicle-mounted device 20 is possible. In such a case, the controller 21 may transmit a predetermined signal through short-range wireless communication at predetermined time intervals. Alternatively, the controller 21 may transmit a predetermined signal as a response to the signal transmitted from the terminal device 10.

The controller 21 may perform authentication of the terminal device 10 based on the authentication request from the terminal device 10. The vehicle-mounted device 20 stores information for uniquely identifying the terminal device 10, such as an identifier, a serial number, or a model number of the terminal device 10 in the storage unit 22. When the controller 21 receives an authentication request from the terminal device 10, the controller 21 authenticates the terminal device 10 using the information included in the authentication request and the information stored in the storage unit 22. The controller 21 may transmit a signal including a result of the authentication as a predetermined signal from the communication unit 23 to the terminal device 10 through short-range wireless communication.

Example of Process of Terminal Device

Figure 5:
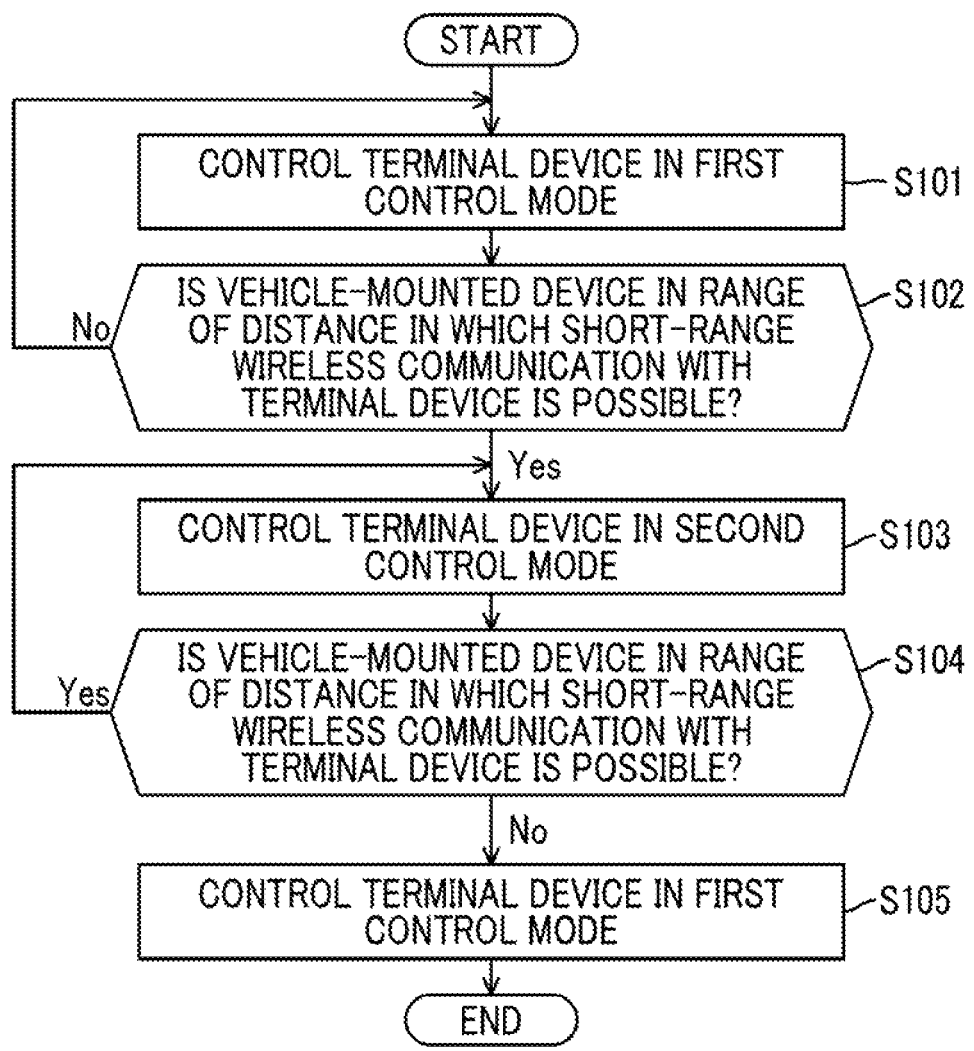
FIG. 5 is a sequence diagram illustrating an operation of a terminal device.

A flow of process of the terminal device 10 according to an embodiment will be described with reference to FIG. 5.

Step S101: The terminal device 10 controls its terminal device in the first control mode.

Step S102: The terminal device 10 determines whether or not the vehicle-mounted device 20 is in the range of the distance in which the short-range wireless communication with the terminal device is possible. Specifically, the terminal device 10 may determine whether or not the predetermined signal is received from the vehicle-mounted device 20 through the short-range wireless communication, as described above. Alternatively, the terminal device 10 may determine whether or not the terminal device receives the power feeding radio waves transmitted from the power feeding unit 27 of the vehicle-mounted device 20. When the terminal device 10 determines that the vehicle-mounted device 20 is not in the range of the distance in which the short-range wireless communication with the terminal device is possible during control in the first control mode (step S102—No), the terminal device 10 continues to control the terminal device in the first control mode, and repeats the determination.

Step S103: When the terminal device 10 determines that the vehicle-mounted device 20 is in the range of the distance in which the short-range wireless communication with the terminal device is possible during the control in the first control mode (step S102—Yes), the terminal device 10 controls the terminal device in the second control mode. When there are the second control modes, the terminal device 10 may control the terminal device in the second control mode corresponding to the kind of vehicle among the second control modes based on kind information indicating the kind of vehicle included in the predetermined signal.

Step S104: During the control in the second control mode, the terminal device 10 determines whether or not the vehicle-mounted device 20 is in the range of the distance in which the short-range wireless communication with the terminal device is possible. When the terminal device 10 determines that the vehicle-mounted device 20 is in the range of the distance in which the short-range wireless communication with the terminal device is possible during control in the second control mode (step S104—Yes), the terminal device 10 continues to control the terminal device in the second control mode.

Step S105: When the terminal device 10 determines that the vehicle-mounted device 20 is not in the range of the distance in which the short-range wireless communication with the terminal device is possible during the control in the second control mode (step S104—No), the terminal device 10 ends control in the second control mode, controls the terminal device in the first control mode, and ends this process.

As described above, the terminal device 10 according to the embodiment includes the communication unit 13 capable of performing short-range wireless communication with the vehicle-mounted device 20 included in the vehicle 2, and the controller 11 configured to control the terminal device in any one of the control modes. The controller 11 determines whether or not the vehicle-mounted device 20 is in the range of the distance in which the short-range wireless communication with the terminal device is possible. The controller 11 controls the terminal device in the second control mode in which the terminal device operates in cooperation with the vehicle 2 when the controller 11 determines that the vehicle-mounted device 20 is in the range of the distance in which the short-range wireless communication with the terminal device is possible in a case in which the controller 11 is controlling the terminal device in the first control mode. The controller 11 controls the terminal device in the first control mode when the controller 11 determines that the vehicle-mounted device 20 is not in the range of the distance in which the short-range wireless communication with the terminal device is possible in a case in which the controller 11 is controlling the terminal device in the second control mode. With this configuration, the terminal device 10 switches the terminal device to the control mode that the terminal device operates in cooperation with the vehicle 2 when the vehicle-mounted device 20 is in the range of the distance in which the short-range wireless communication with the terminal device is possible, and causes the terminal device to return to the control mode before switching when the vehicle-mounted device 20 is not in the range of the distance in which the short-range wireless communication with the terminal device is possible. Accordingly, the user of the terminal device 10 continues to use the terminal device 10 without performing a manipulation such as changing the setting of the terminal device 10 at the time of the start of cooperation of the terminal device 10 with the vehicle 2 or at the time of the end of the cooperation. Therefore, convenience of the communication with the vehicle 2 including the vehicle-mounted device 20, which is performed using the terminal device 10, is improved.

When the controller 11 of the terminal device 10 according to the embodiment controls the terminal device in the second control mode, the terminal device 10 repeats the determination as to whether or not the vehicle-mounted device 20 is in a range of the distance in which short-range wireless communication with the terminal device is possible. With this configuration, while the terminal device 10 controls the terminal device in the control mode operating in cooperation with the vehicle 2, the terminal device 10 can detect that the vehicle-mounted device 20 is not in the range of the distance in which the short-range wireless communication with the terminal device is possible. Accordingly, the terminal device 10 can end cooperation with the vehicle 2 of the terminal device 10 regardless of a user manipulation such as setting change of the terminal device 10.

The controller 11 of the terminal device 10 according to the embodiment determines whether or not the vehicle-mounted device 20 is in a range of a distance in which the short-range wireless communication with the terminal device is possible, based on whether or not the controller 11 has received a predetermined signal from the vehicle-mounted device 20 via the short-distance wireless communication. With this configuration, the terminal device 10 can determine whether or not the vehicle-mounted device 20 is in the range of the distance in which the short-range wireless communication with the terminal device is possible regardless of the user manipulation of the terminal device 10, and convenience for the user who uses the terminal device 10 is improved.

In the embodiment, the predetermined signal includes a result of the vehicle 2 authenticating the terminal device 10 based on an authentication request from the terminal device 10. With this configuration, when the terminal device 10 operates in cooperation with the vehicle 2, the terminal device 10 and the vehicle 2 can be operated in cooperation in a secure environment.

In the embodiment, there are the second control modes respectively corresponding to a plurality of kinds of vehicles 2. The predetermined signal includes information indicating the kind of the vehicle 2 including the vehicle-mounted device 20. The controller 11 controls the terminal device in the second control mode corresponding to the kind of vehicle among the second control modes, when a predetermined signal is received. With this configuration, the terminal device 10 can change the control of the terminal device according to the vehicle 2 operating in cooperation. Accordingly, for example, when the user of the terminal device 10 gets in the vehicles 2, the terminal device 10 can change content of control according to the vehicle 2 in which the user has got, and convenience for the user who uses the terminal device 10 is improved.

The communication unit 13 of the terminal device 10 according to the embodiment can further perform wireless communication of a scheme different from the vehicle 2 and the short-range wireless communication. The controller 11 performs wireless communication with the vehicle 2 when the controller 11 controls the terminal device in the second control mode. With this configuration, the terminal device 10 can control the wireless communication with the vehicle 2 by switching the control mode, and convenience of the communication with the vehicle 2 including the vehicle-mounted device 20, which is performed using the terminal device 10, is improved.

The communication unit 13 of the terminal device 10 according to the embodiment can further perform mobile communication with an external device not included in the vehicle 2. When the controller 11 controls the terminal device in the second control mode, the controller 11 acquires information from the vehicle 2 and transmits at least a part of the information acquired from the vehicle 2 to the external device. With this configuration, the terminal device 10 can control the acquisition of the information from the vehicle 2 by switching the control mode, and convenience of the communication with the vehicle 2 including the vehicle-mounted device 20, which is performed using the terminal device 10, is improved.

The terminal device 10 according to the embodiment further includes the power storage unit 14. The vehicle-mounted device 20 includes the communication unit 23 capable of performing short-range wireless communication, and the power feeding unit 27 provided near the communication unit 23 and capable of transmitting power feeding radio waves. The controller 11 determines whether or not the vehicle-mounted device 20 is in the range of the distance in which the short-range wireless communication with the terminal device is possible, based on whether or not the terminal device has received the power feeding radio waves transmitted from the power feeding unit 27. With this configuration, the terminal device 10 can determine whether or not the vehicle-mounted device 20 is in the range of the distance in which the short-range wireless communication with the terminal device is possible in a state in which power is stably supplied regardless of a user manipulation of the terminal device 10, and convenience for the user who uses the terminal device 10 is improved.

The terminal device 10 according to the embodiment further includes an input unit 16. The controller 11 controls the terminal device in the second control mode based on the control information in the second control mode received by the input unit 16. With this configuration, the user can set control content of the terminal device 10 in the second control mode in advance, and convenience for the user who uses the terminal device 10 is improved.

Although the present disclosure has been described based on the drawings and examples, it should be noted that those skilled in the art can easily make various changes and modifications based on the disclosure. Therefore, it should be noted that these variations and modifications are included in the scope of the present disclosure. For example, functions or the like included in each means or each step can be rearranged so as not to be logically contradictory, and a plurality of means or steps can be combined into one or divided.

For example, in the embodiment described above, the example in which the vehicle 2 includes one vehicle-mounted device 20 has been described, but the disclosure is not limited thereto. When the vehicle 2 includes a plurality of vehicle-mounted devices 20, the functions and process of the vehicle-mounted devices 20 described above may be provided by any of the vehicle-mounted devices 20. For example, the function of performing the short-range wireless communication and the function of authenticating the terminal device 10 may be provided by different vehicle-mounted devices 20.

Further, for example, in the embodiment described above, the example in which the vehicle-mounted device 20 has a function of authenticating the terminal device 10 and the vehicle 2 authenticates the terminal device 10 based on the authentication request from the terminal device 10 has been described, but the disclosure is not limited thereto. The terminal device 10 may have the function of authenticating the vehicle 2 including the vehicle-mounted device 20, and the terminal device 10 may perform the authentication of the vehicle 2 including the vehicle-mounted device 20 based on the authentication request from the vehicle-mounted device 20. In such a case, the terminal device 10 may receive a signal including the authentication request from the vehicle-mounted device 20 through the short-range wireless communication, and determine whether or not the vehicle-mounted device 20 is in the range of the distance in which the short-range wireless communication with the terminal device 10 is possible based on the result of authenticating the vehicle 2 including the vehicle-mounted device 20.

Further, a configuration in which an information processing device, such as a smart phone or a computer, is caused to function as the terminal device 10 or the vehicle-mounted device 20 according to the embodiment described above is also possible. Specifically, a program describing process content for realizing each function of the terminal device 10 or the vehicle-mounted device 20 according to the embodiment is stored in a memory of the information processing device, and the program is read and executed by a processor of the information processing device. Therefore, the disclosure according to the embodiment can also be realized as a program that can be executed by the processor.

What is claimed is:

1. A terminal device comprising:
    a near-field communication device configured to perform short-range wireless communication with a vehicle-mounted device included in a vehicle;
    a wireless, communication device, which is different than the near-field communication device, the wireless communication device being configured to establish a wireless connection with a vehicle-mounted equipment included in the vehicle and transmit application information to be executed on the vehicle-mounted equipment during the established wireless connection; and
    a controller configured to:
        control the terminal device in any one of a plurality of control modes,
        determine whether the vehicle-mounted device is in a range of a distance in which the near-field communication device is configured to establish the short-range wireless communication with the vehicle-mounted device;
        when the controller is controlling the terminal device in a first control mode of the plurality of control modes, control the terminal device to change to operate in a second control mode of the plurality of modes in which the terminal device operates in cooperation with the vehicle using the wireless communication device, in response to the controller determining that the vehicle-mounted device is in the range of the distance in which the near-field communication device is configured to establish the short-range wireless communication with the vehicle-mounted device, and
        when the controller is controlling the terminal device in the second control mode of the plurality of control modes, control the terminal device to change to operate in the first control mode in response to the controller determining that the vehicle-mounted device is not in the range of the distance in which the near-field communication device is configured to establish the short-range wireless communication with the vehicle-mounted device.

2. The terminal device according to claim 1, wherein when the controller is controlling the terminal device in the second control mode, the controller repeats the determination of whether the vehicle-mounted device is in the range of the distance in which the near-field communication device is configured to establish the short-range wireless communication with the vehicle-mounted device.

3. The terminal device according to claim 1, wherein the controller determines whether the vehicle-mounted device is in the range of the distance in which the near-field communication device is configured to establish the short-range wireless communication with the vehicle-mounted device based on whether a predetermined signal is received from the vehicle-mounted device through the short-range wireless communication.

4. The terminal device according to claim 3, wherein the predetermined signal includes a result of authenticating the terminal device, which is performed by the vehicle based on an authentication request from the terminal device.

5. The terminal device according to claim 3, wherein:
    the plurality of control modes includes a plurality of the second control modes, which includes the second control mode, respectively corresponding to a plurality of types of vehicles;

the predetermined signal includes information indicating a type of vehicle including the vehicle-mounted device; and the controller controls the terminal device in the corresponding second control mode corresponding to the type of the vehicle among the plurality of second control modes when the predetermined signal is received.

6. The terminal device according to claim 1, wherein:
the wireless communication device is configured to perform the wireless communication of a scheme different from the short-range wireless communication performed by the near-field communication device with the vehicle; and
when the controller controls the terminal device in the second control mode, the controller performs the wireless communication with the vehicle.

7. The terminal device according to claim 1, wherein:
the wireless communication device is configured to further perform mobile communication with an external device not included in the vehicle; and
when the controller controls the terminal device in the second control mode, the controller acquires information from the vehicle and transmits at least a part of the information acquired from the vehicle to the external device.

8. The terminal device according to claim 1, further comprising a power storage, wherein:
the vehicle-mounted device includes a short-range wireless communication device configured to perform the short-range wireless communication with the near-field communication device of the terminal device, and a power supply provided near the short-range wireless communication device of the vehicle-mounted device and configured to transmit power feeding radio waves; and
the controller determines whether the vehicle-mounted device is in the range of the distance in which the near-field communication device is configured to establish the short-range wireless communication with the vehicle-mounted device based on whether the terminal device receives the power feeding radio waves transmitted from the power supply.

9. The terminal device according to claim 1, further comprising an input device, wherein the controller controls the terminal device in the second control mode based on control information in the second control mode received from the input device.

10. A method of controlling a terminal device, the method comprising:
a step of performing, by a near-field communication device, short-range wireless communication with a vehicle-mounted device included in a vehicle;
a step of establishing, by a wireless communication device which is different than the near-field communication device, a wireless connection with a vehicle-mounted equipment included in the vehicle, and transmitting application information to be executed on the vehicle-mounted equipment during the established wireless connection;
a step of controlling, by a controller, the terminal device in any one of a plurality of control modes;
a step of determining, the controller, whether the vehicle-mounted device is in a range of a distance in which the near-field communication device establishes the short-range wireless communication with the vehicle-mounted device;
a step of, when the controller is controlling the terminal device in a first control mode of the plurality of control modes, controlling, by the controller, the terminal device to change to operate in a second control mode of the plurality of control modes in which the terminal device operates in cooperation with the vehicle using the wireless communication device, in response to determining that the vehicle-mounted device is in the range of the distance in which the near-field communication device establishes the short-range wireless communication with the vehicle-mounted device; and
a step of, when the controller is controlling the terminal device in the second control mode of the plurality of control modes, controlling, by the controller, the terminal device to change to operate in the first control mode of the plurality of control modes in response to determining that the vehicle-mounted device is not in the range of the distance in which the near-field communication device establishes the short-range wireless communication with the vehicle-mounted device.

11. A non-transitory computer readable storage medium storing a program causing a computer of a terminal device to execute:
a step of performing, by a near-field communication device, short-range wireless communication with a vehicle-mounted device included in a vehicle;
a step of establishing, by a wireless communication device which is different than the near-field communication device, a wireless connection with a vehicle-mounted equipment included in the vehicle, and transmitting application information to he executed on the vehicle-mounted equipment during the established wireless connection;
a step of controlling, by a controller, the terminal device in any one of a plurality of control modes;
a step of determining, by the controller, whether the vehicle-mounted device is in a range of a distance in which the near-field communication device establishes the short-range wireless communication with the vehicle-mounted device;
a step of, when the controller is controlling the terminal device in a first control mode of the plurality of control modes, controlling, by the controller, the terminal device to change to operate in a second control mode of the plurality of control modes in which the terminal device operates in cooperation with the vehicle using the wireless communication device, in response to determining that the vehicle-mounted device is in the range of the distance in which the near-field communication device establishes the short-range wireless communication with the vehicle-mounted device; and
a step of, when the controller is controlling the terminal device in the second control mode of the plurality of control modes, controlling, by the controller, the terminal device to change to operate in the first control mode of the plurality of control modes in response to determining that the vehicle-mounted device is not in the range of the distance in which the near-field communication device establishes the short-range wireless communication with the vehicle-mounted device.

* * * * *